July 3, 1962 J. S. FALZONE 3,042,014
ANTI-SMOG MEANS
Filed April 12, 1961
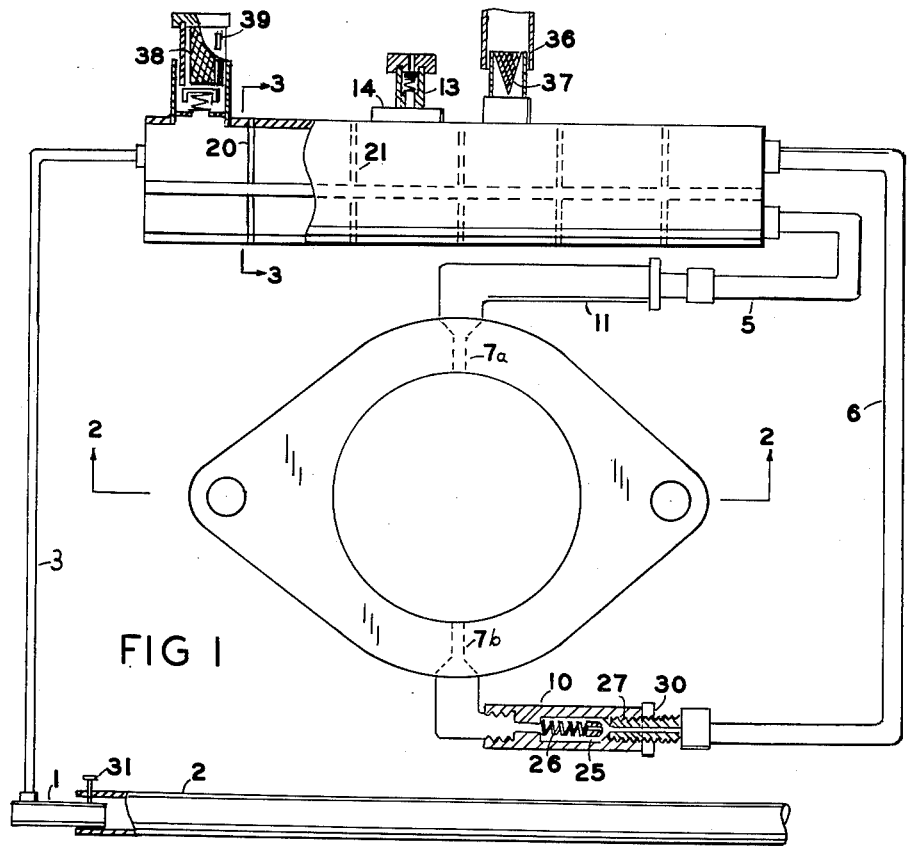
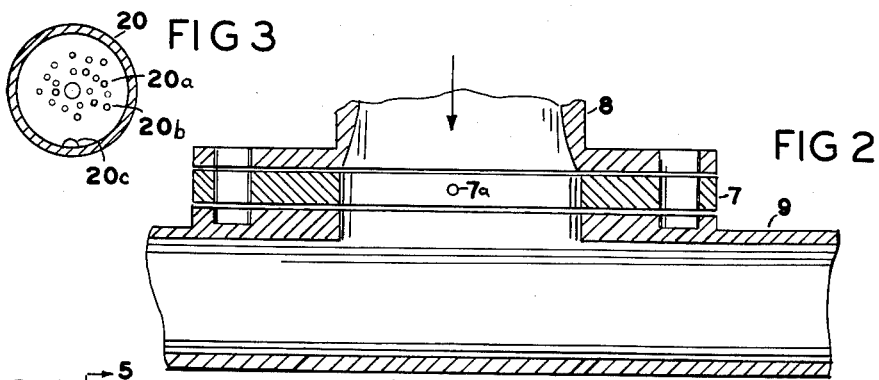
INVENTOR.
JOSEPH S. FALZONE
BY James P. Malone

United States Patent Office 3,042,014
Patented July 3, 1962

3,042,014
ANTI-SMOG MEANS
Joseph S. Falzone, 62 Crescent Court, Old Bethpage, N.Y., assignor of twenty percent to James P. Malone and fifty percent to Ann C. Falzone, Nassau, N.Y.
Filed Apr. 12, 1961, Ser. No. 102,465
4 Claims. (Cl. 123—119)

This invention relates to anti smog means for internal combustion engines and more particularly to means for reducing air pollution caused by automobiles and at the same time increasing the efficiency of automobile engines.

This application is an improvement of my Patent No. 2,969,782, of the same title, granted January 31, 1961.

It is well known that the efficiency of internal combustion engines is quite low. One of the factors in this low efficiency is the lack of optimum mixing of the gasoline and air which results in incomplete combustion which represents a loss of potential energy and an increase in smoke and soot output from the exhaust.

The air pollution caused by automobile in large cities contributes greatly to the industrial smog which is a serious problem and which is becoming more acute as time goes on.

The present invention provides a means for minimizing smog due to incomplete combustion of automobile engines by increasing the mixing efficiency, by filtering the exhaust and by recirculating a portion of the exhaust gases through a mixer and then back through the engine. Therefore the present invention not only minimizes smog and pollution but by the same process extracts extra energy out of the fuel so that the optimum condition is obtained whereby there is a maximum combustion and a minimum of waste products.

More specifically, the invention provides mixing means inserted between the carburetor and the intake manifold; a filter is provided in the exhaust pipe and a portion of the exhaust gases are taken from the filter and recirculated through the mixing device and the combustion chambers.

A pneumatic tank is provided in the recirculating path which may be used to add alcohol or a catalyst to the fuel mixture, for instanec to minimize smog or for special conditions such as icing of the carburetor.

Accordingly, a principal object of the invention is to provide new and improved fuel feeding, and handling means for internal combustion engines.

Another object of the invention is to provide means to minimize air pollution or smog caused by automobile engines.

Another object of the invention is to provide means to minimize air pollution or smog caused by automobile engines in combination with means to increase the mileage efficiency of automobile engines.

Another object of the invention is to provide means to minimize air pollution or smog caused by automobile engines in combination with means to increase the efficiency of automobile engines, including means to filter the exhaust gases to feed back a portion of the exhaust gases through a connection located between the carburetor and the intake manifold, and automatic valving to minimize back pressure.

Another object of the invention is to provide new and improved means to add a catalyst or other additive to minimize the effects of smog, smoke or icing of the fuel lines.

These and other objects of the invention will be apparent from the following specification and drawings, of which:

FIG. 1 is a schematic diagram of the embodiment of the invention.

FIG. 2 is a side sectional view of part of the embodiment of FIG. 1.

FIG. 3 is a sectional view along the line 3—3 of FIG. 1.

FIG. 4 is an end view of the filter of FIG. 1.

FIG. 5 is a sectional view along the lines 5—5 of FIG. 4.

Referring to the figures, the invention generally provides a filter 1, which is inserted in the existing exahust pipe 2 of the vehicle, a portion of the exhaust is fed through the conduit 3 from the filter to a pneumatic tank 4. The output of the pneumatic tank 4 is connected by means of the conduits 5, 6 to a flange 7 which is inserted between the output of the existing carburetor 8 and the existing input manifold. Automatic pressure responsive valving is provided by the valves 10, 11, which are connected in series with the conduits 5 and 6. A pressure relief valve 12 is provided in the filter 1 and a pressure relief valve 13 is provided in the removable cap 14 connected to the pneumatic tank 4. The filter 1 contains a removable filter cartridge 15 which may be of a honeycomb metal design or other equivalent filtering materials.

The general operation is that a portion of the exhaust gases are recirculated back from the filter 1 through the pneumatic tank 4 and through the flange 7 where it is mixed with the output from the carburetor 8.

Specifically referring to FIGURE 1, the pneumatic tank 4 comprises a hollow body which may be cylindrical and which is divided into a plurality of compartments by means of dividers 20, 21, etc. which are connected to the sides of the tank 4 and also mounted on an internal rod 22 which extends along the axis of the tank 4. As shown in FIG. 3 the dividers 20, 21, etc. have a great many pin holes 20a, 20b, etc. At the bottom of each divider there is an aperture 20c which permits distribution of additives which may be inserted through the removable cap 14, for instance the additive may be a catalyst for the purpose of reducing smog or smoke.

The purpose of the pinholes is to permit communication between the compartments while providing a filtering action for removing solid particles from the unburnt hydrocarbons which are being recirculated.

The amount of the unburnt hydrocarbons which are being recirculated is governed by the valves 10 and 11, which are identical and which contain a needle valve arrangement comprising a pointed projection 25 mounted on the spring 26. The valve member 25 has a small bore along its axis to permit some communication at all times. When the vacuum pressure is increased in the intake manifold by speeding up the motor, then the valve member 24 will be sucked away from the valve seat 27, thus providing a much greater valve opening for the recirculating of unburnt hydrocarbons. A spring loaded relief valve 12 is connected to the filter 1 as shown in FIG. 5 for the purpose of relieving excess pressure in the filter. The valve may be a conventional spring loaded relief valve.

Another conventional spring loaded relief valve 13 is provided in the pneumatic tank 3 and may be conveniently mounted on the cap 14. If desired one or more additional relief valves may be incorporated in the tank 3. These valves operate to open to atmospheric pressure if the internal pressure exceeds a predetermined amount, depending upon the spring pressure chosen. In the valve 10 the spring pressure may be adjusted by means of the nut 30 which is fixedly connected to the valve seat 27. The main purpose of the valves 10 and 11 is to adjust the idling speed and they cooperate with the tank 3 to minimize any pulsating effect.

Referring to FIG. 5, the filter 1 may comprise a cylindrical body which may be inserted at the end of the exhaust pipe 2, for instance by means of a clamp 31.

The upper half of the filter is closed off by the member 32, which extends back along the axis of the filter to form an enclosure at the upper rear portion of the filter. This enclosure or pocket tends to trap a portion of the unburnt hydrocarbons with sufficient pressure to feed them back through the conduit 3 to the pneumatic tank 4.

Therefore, the present invention provides means for taking a portion of the exhaust gases and recirculating them through the input manifold so that they are burned again in the engine, thereby minimizing the unburnt hydrocarbons and gases in the exhaust pipe and also contributing significantly to the efficiency of the engine in terms of mileage per gallon. A portion of the unburnt hydrocarbons having lower specific gravity than the burnt hydrocarbons tend to rise and are reinserted in the system through the flange 7, which has a pair of bores 7a and 7b which are located just at the output of the carburetor 8. It is preferable to locate the bores 7a and 7b in a Venturi chamber at the point of minimum diameter so that the gases will be reintroduced into the system at the point of greatest speed of the motor for maximum mixing efficiency.

A vacuum relief valve 35 is preferably inserted in the tank 4. This may be a conventional spring loaded valve connecting to the atmosphere through filter 38 and slots 39. The vacuum relief valve 35 avoids excessive vacuum in the tank, cools the tank and aids in preserving a proper air to fuel ratio.

If desired a "crank case blow by" system may be incorporated by connecting the engine breather pipe 36 to the tank 4 through a cone filter 37 which may be of screen mesh. The system is maintained by the pneumatic tank at a lower pressure than that within the crank case. By maintaining this pressure differential the system prevents oil leakage past the rings and keeps positive pressure in the crank case.

Many modifications may be made by those who desire to practice the invention without departing from the scope thereof which is defined by the following claims; for instance the pipe 3 may be connected in line with the exhaust pipe in the position now occupied by the valve 12 and the valve 12 changed to the position now occupied by the pipe 3. This arrangement provides an impact pressure in the pipe 3.

I claim:

1. Fuel handling means for internal combustion engines of the type having a carburetor, an intake manifold and an exhaust pipe comprising a filter mounted in said exhaust pipe, connection means between said carburetor and said intake manifold, and means connecting said filter to said connection means including a tank connected to the input side of said connection means and a pipe connecting said filter to said tank, a portion of said filter being blocked off, said tank comprising a cylinder having a plurality of partitions perpendicular its axis, said partitions having a plurality of pinholes.

2. Fuel handling means for internal combustion engines of the type having a carburetor, an intake manifold and an exhaust pipe comprising a filter mounted in said exhaust pipe, a connection between said carburetor and said intake manifold, means connecting said filter to said connection comprising a tank connected to the input side of said connection, means connecting said exhaust pipe to said tank, said tank being divided by a plurality of partitions, said partitions having a plurality of pinholes.

3. Fuel recirculating means for internal combustion engines of the type having an intake manifold and an exhaust pipe comprising a pickup connected to said exhaust pipe, means connecting said pickup to said intake manifold comprising a tank connected to said manifold, means connecting said pickup to said tank, filtering means in said tank and valve means connected between said tank and intake manifold, said valve means being responsive to vacuum pressure in said intake manifold.

4. Anti-smog means for internal combustion engines of the type having an intake manifold and an exhaust pipe comprising a filter connected to said exhaust pipe, and means connecting said filter to said manifold, including a tank connected to said manifold and a pipe connecting said filter to said tank, a portion of said filter being blocked off.

References Cited in the file of this patent

UNITED STATES PATENTS

| | | |
|---|---|---|
| 1,750,342 | Bailey | Mar. 11, 1930 |
| 2,354,179 | Blanc | July 25, 1944 |
| 2,737,936 | Clarke | Mar. 13, 1956 |
| 2,946,325 | Gentile | July 26, 1960 |
| 2,956,559 | Johnson | Oct. 18, 1960 |